E. W. GETZ.
POWER CULTIVATOR.
APPLICATION FILED JUNE 14, 1921.

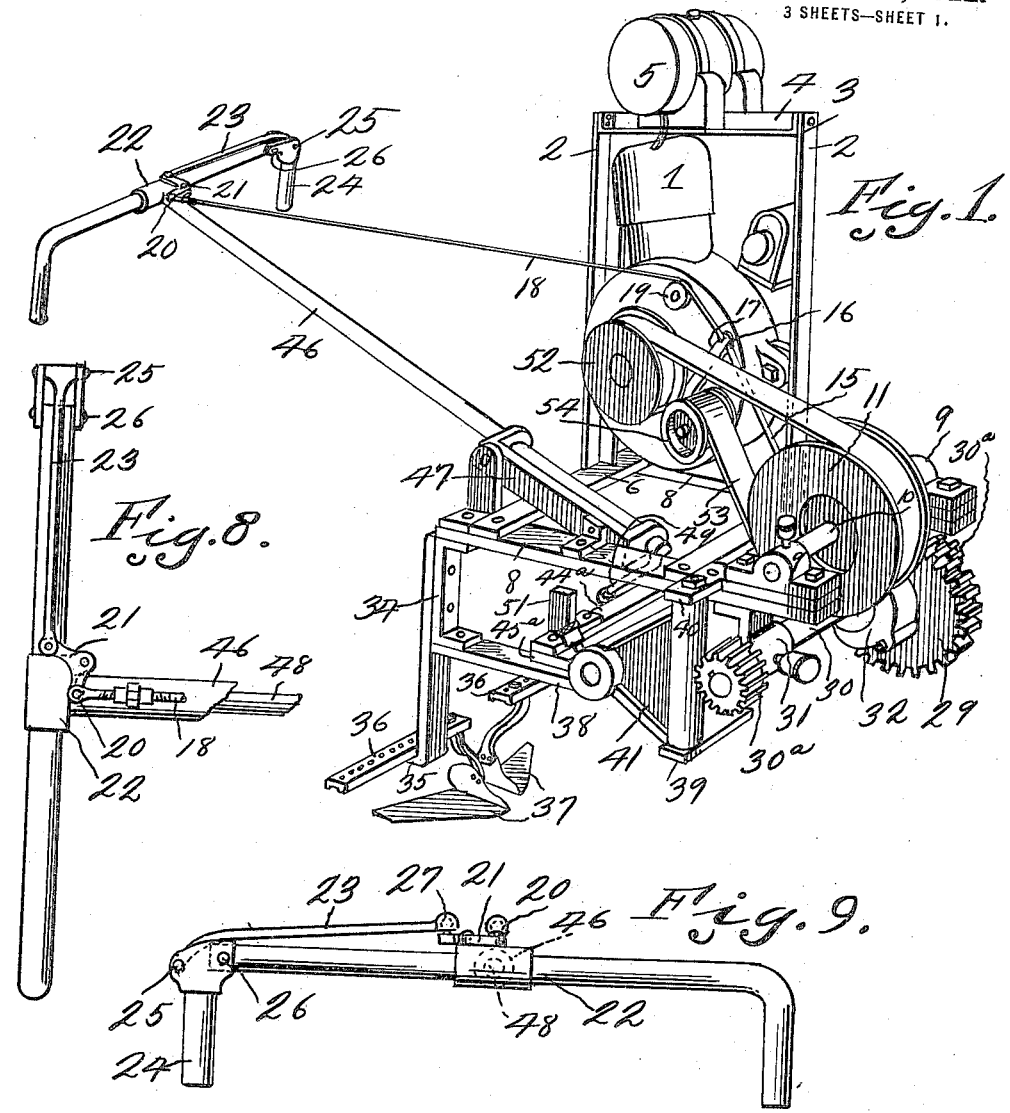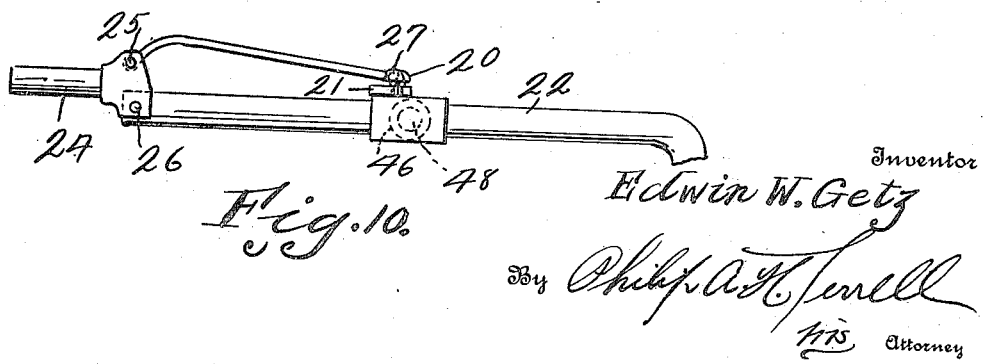

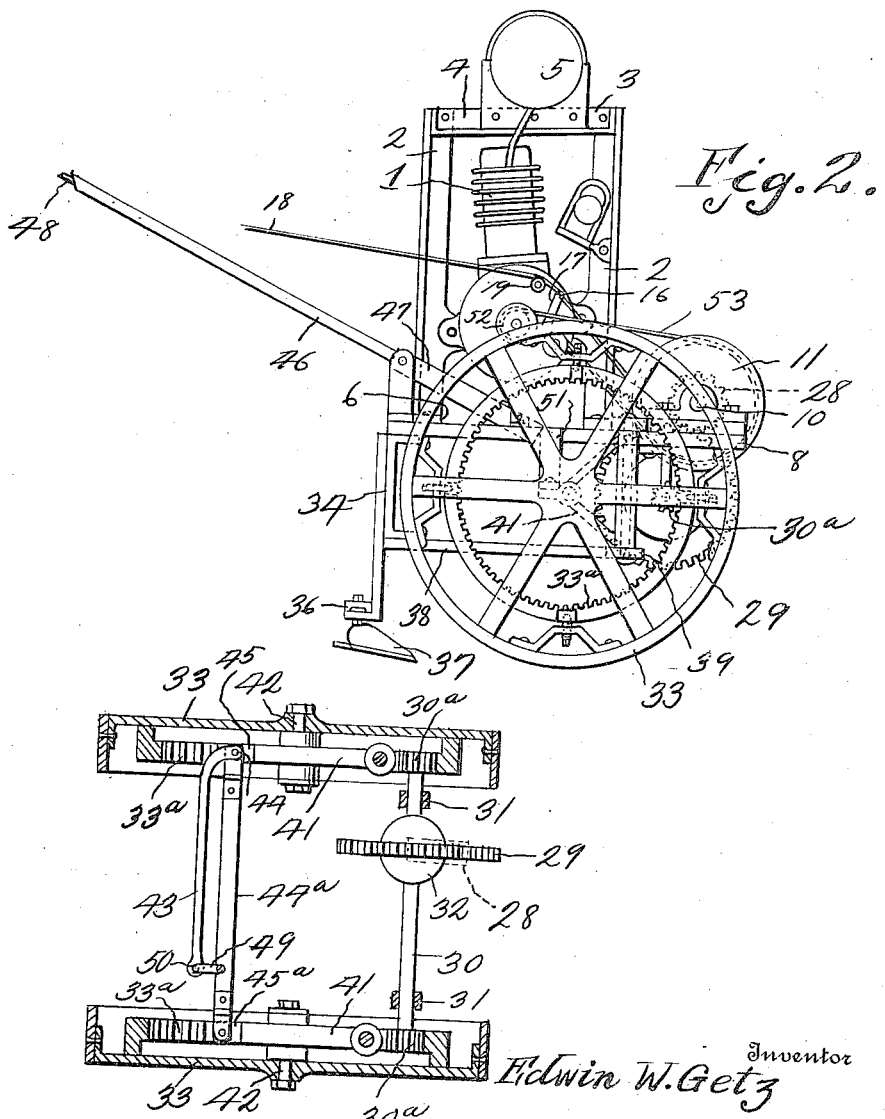

1,424,297.

Patented Aug. 1, 1922.
3 SHEETS—SHEET 3.

Inventor
Edwin W. Getz
By Philip A. H. Ferrell
his Attorney

UNITED STATES PATENT OFFICE.

EDWIN W. GETZ, OF LOUDONVILLE, OHIO.

POWER CULTIVATOR.

1,424,297.  Specification of Letters Patent.  Patented Aug. 1, 1922.

Application filed June 14, 1921. Serial No. 477,481.

*To all whom it may concern:*

Be it known that EDWIN W. GETZ, a citizen of the United States, residing at Loudonville, in the county of Ashland and State of Ohio, has invented certain new and useful Improvements in Power Cultivators, of which the following is a specification, reference being had therein to the accompanying drawing.

The invention relates to power cultivators, and has for its object to provide a device of this character wherein the steering operation is simplified and rendered easy thereby allowing the operator to follow the row.

A further object is to provide a power cultivator wherein the steering of the same is accomplished by steering the wheels by moving the tractor frame transversely on pivotal points located forwardly of the center of the wheel, thereby allowing the row that is being cultivated to be followed with less steering of the wheels, than if the steering alone were depended on to adjust the cultivator to the row.

A further object is to provide a cultivator comprising a frame having an engine thereon, said frame adjacent its sides having pivoted thereto to swing in a horizontal plane, rearwardly extending wheel supporting arms to the rear ends of which wheels are supported, thereby locating the centers of the wheels rearwardly of the frame pivotal points. Also to provide a rockable handle bar having a downwardly extending arm, which arm has a link connection with the rear end of one of the rearwardly extending wheel supporting arms, said wheel supporting arms having their rear ends connected together by a transversely disposed bar, which bar insures a parallel movement of the wheel supporting arm during a tractor steering operation. The driving of the wheels is accomplished through the transversely disposed shaft carried by the frame and located forwardly of the pivotal points of the wheel supported arms provided with drive pinions meshing with internal gears carried by the supporting wheels, said drive pinions and gears having a looseness of play sufficient to allow lateral movement in relation to each other during a steering operation.

A further object is to provide means whereby the clutch lever may be controlled from adjacent the handle bars.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the cultivator showing the same with its wheels removed.

Figure 2 is a side elevation of the cultivator.

Figure 3 is a horizontal sectional view through the drive wheels, showing the driving mechanism and the wheel supporting arms in normal position.

Figure 8 is a plan view of a portion of the operation handle.

Figure 9 is a rear elevation of the handle bars, showing the pivoted hand member thereof in the position it assumes when the clutch is engaged.

Figure 10 is a view similar to Figure 9 but showing the position the pivoted handle member assumes when the clutch is disengaged.

Figure 7:
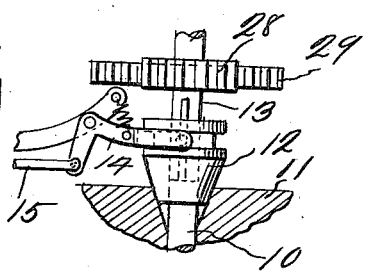
Figure 7 is a detail sectional view showing a conventional form of clutch.

Referring to the drawings, the numeral 1 designates a conventional form of internal combustion engine, which engine is supported on and secured to the upwardly extending bars 2 of the vertically disposed frame 3. The transversely disposed bar 4 of the frame 3 supports a fuel tank 5 which may be connected to the engine in any suitable manner. The lower ends of the vertically disposed bars 2 are secured to transversely disposed bars 6 which have their ends secured at 7 to longitudinally disposed bars 8, thereby forming a horizontally disposed frame. Secured to the forward ends of the bars 8 are bearings 9, in which bearings is rotatably mounted a shaft 10 which carries a drive pulley 11. The drive pulley 11 is driven by a conventional form of clutch member 12 which is slidably keyed on the shaft 13 which is in axial alignment with the shaft 10 as clearly shown in Figure 7. Clutch member 12 is moved into and out of engagement with the drive pulley 11 by means of a bell crank 14, which is controlled through the medium of a rearwardly extending rod 15, which rod is connected at 16 to a lever 17, said lever in turn having connected thereto a rearwardly extending flexible member 18 which passes over a guide pulley 19 and has its rear end connected at 20 to a bell crank lever 21, which lever is pivoted to the handle bars 22, and is operated through the medium of a link connection 23 with a pivoted handle 24, to which handle the link 23 is pivotally connected at 25. It will be seen that when the handle member 24 is in the position shown in Figure 9 that the pivotal point 25, the pivotal point 26 and the ball and socket pivotal point 27 of the link 23 are substantially in alignment with each other, therefore the clutch will be locked in operative position as shown in Figure 7, thereby allowing power to be transmitted to the shaft 13 and the drive gear 28 carried thereby. The drive gear 28 meshes with a differential gear 29 carried on the countershaft 30, which countershaft is rotatably mounted in bearings of brackets 31 extending downwardly from the bars 8. The differential gear 29 is carried by a conventional form of differential 32, which allows independent movement of the traction wheels 33 during a steering operation.

Extending downwardly from the rear ends of the horizontal bars 8 are arms 34, the lower ends of which terminate in horizontally disposed portions 35, to which are adjustably secured transversely disposed cultivator shovel bars 36, which carry the cultivator shovels 37. It will be seen that the cultivator shovels and their bars may be adjusted inwardly and outwardly in relation to each other to accommodate the same to the width of the road, or for close or open cultivation. Extending forwardly from the downwardly extending arms 34 are horizontally disposed bars 38, the forward ends of which terminate in outwardly extending apertured arms 39, which arms and the apertures therein are in vertical alignment with the apertured arms 40 carried by the bars 8. Pivoted between the arms 39 and 40 and adapted to move in a horizontal plane, are rearwardly extending traction wheel supporting arms 41, to the rear ends of which arms the traction wheels 33 are pivotally mounted as at 42. It will be seen that the pivotal points of the arms 41 are forwardly of the centers of the wheels and that frame as a whole is pivoted forwardly of the centers of the wheel, thereby during a steering operation allowing the frame as a whole to move laterally at the same time that the wheels are moved by the connecting rod 43 which is pivotally connected at 44 to a rearwardly extending lug 45 of one of the arms 41, said rearwardly extending lug 45 being in turn connected to a second rearwardly extending lug 45$^a$ carried by the other pivoted arm 41, therefore when the connecting rod 43 is moved transversely both traction wheel supporting arms 41 will be moved in parallel relation to each other at the same time the frame as a whole is moved transversely. By providing this mechanism it will be seen that when the cultivator is in operation, when the wheels are turned, they turn on a line with the center of the wheels and the pivotal points to the frame being in front of the center of the wheels, the whole frame is swung in a corresponding direction. The greater the distance the pivotal points of the rearwardly extending arms 41 are located forwardly of the centers of the wheels, the greater the swing in proportion to the movement of the wheels. Thus it will be seen that a cultivator is provided in which in addition to following the row closely by steering the wheels and consequent movement of the frame transversely, the row may be followed with less steering of the wheels, than if the steering alone were depended on to adjust the cultivator shovels 37 to the row.

Rockably mounted in a sleeve 46 carried by the bracket 47 of one of the bars 8 is a shaft 48, the rear end of which shaft terminates in the handle bars 22 and by tilting said handle bars the rockable shaft 48 can be rocked in such a manner that its downwardly extending arm 49 which is universally connected at 50 to the connecting rod 43 may be moved from side to side thereby allowing complete control of the traction wheel supporting arms 41 through the medium of the connecting rods 44$^a$. If so desired the connecting rod 44$^a$ may be provided with upwardly extending lugs 51, which cooperate with the sides of the horizontally disposed bars 8 for limiting the transverse movement of said bar 44$^a$.

The engine 1 is provided with a drive pulley 52, which drive pulley is belted to the drive pulley 11 by means of a belt 53 which passes over a belt tightening pulley 54. For purposes of illustration a belt drive is shown and a conventional form of clutch mechanism, however it is to be understood that this structure may be varied and any form of drive utilized, whether belt, chain or gear.

From the above it will be seen that a power driven cultivator is provided which is simple in construction, compact in form and so supported on its traction wheels that the steering movement is reduced to a minimum and the cultivator as a whole so controlled that it is completely within the control of the operator at all times.

Figure 4:
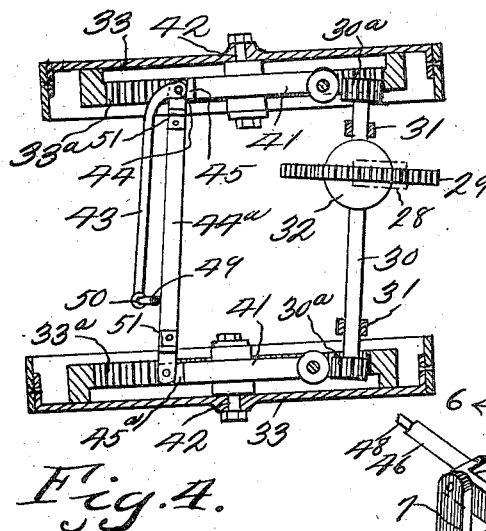
Figure 4 is a view similar to Figure 3 but showing the parts in the positions they assume when making a turn to the left.
Figure 5:
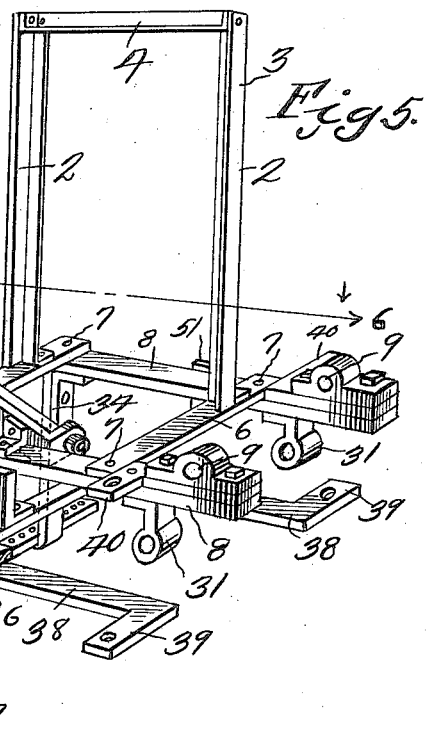
Figure 5 is a perspective view of the frame.
Figure 6:
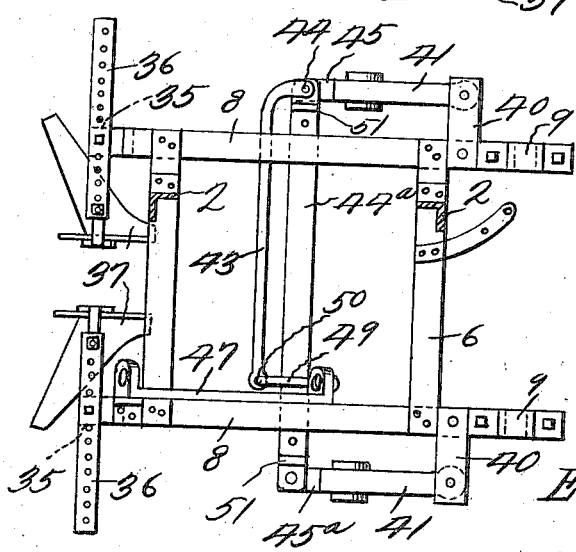
Figure 6 is a horizontal sectional view taken on line 6—6 of Figure 5.

The traction wheels 33 are driven by the shaft 30 by means of drive gears 30ª which mesh with the internal gears 33ª carried by the traction wheels. The meshing of the gears 30ª and the internal gears 33ª being sufficiently loose to allow movement of said gears in relation to each other during steering operation as clearly shown in Figures 3 and 4.

The invention having been set forth what is claimed as new and useful is:—

1. A cultivator comprising a frame, brackets pivoted to said frame and movable in a horizontal plane, said brackets extending rearwardly and having their rear ends connected together, traction wheels pivoted on said brackets adjacent their rear ends, internal gearing carried by the traction wheels, a source of power carried by the frame, gear connections between the driving wheels and the source of power, said gear connections being located forwardly of the pivotal points of the rearwardly extending wheel supporting brackets.

2. A power cultivator comprising a frame, a source of power located on said frame, driving wheels pivoted to brackets, said brackets being pivoted to the frame forwardly of the centers of the driving wheels, the free ends of said brackets being connected together by a connecting bar, a transversely disposed drive shaft carried by the frame forwardly of the pivotal points of the brackets, gears carried by said transversely disposed shaft, said gears meshing with internal gears carried by the driving wheels, means for rotating said transversely disposed shaft from the source of power, and means whereby the rear ends of the brackets may be moved inwardly and outwardly for pivoting the drive wheels on their centers.

3. The combination with a power cultivator comprising a frame, of wheel steering means therefor, said means comprising brackets horizontally disposed, said brackets having their forward ends pivoted to the frame, traction wheels pivoted to said brackets intermediate their length, a connection bar connecting the rear ends of the brackets together, means for moving said connecting bar transversely, a drive shaft carried by the frame, said drive shaft having gear connections with the traction wheels at points forwardly of the pivotal points of the brackets.

4. The combination with a power cultivator comprising a frame having an engine thereon and a drive shaft having gear connections with the traction wheels, of supporting means for connecting said wheels to the frame and forming steering means for the cultivator, said supporting means comprising brackets pivoted to the sides of the frame and extending rearwardly and having their ends pivoted together, traction wheels being pivoted to said brackets adjacent their free ends, the gear connections between the drive shaft and the traction wheels being located forwardly at the pivotal points of the brackets.

5. The combination with a power cultivator comprising a frame, of wheel steering means therefor, said wheel steering means comprising horizontally disposed brackets pivoted to the frame at their forward ends and movable in parallel relation to each other, said brackets having pivoted thereto intermediate their ends traction supporting wheels, a drive shaft carried by the frame forwardly of the pivotal points of the brackets and having gear connections with the traction wheels, an engine carried by the frame and means whereby power from the engine may be utilized to drive the traction wheels.

6. The combination with a power cultivator comprising a frame having an engine thereon, of wheel steering means therefor, said wheel steering means comprising horizontally disposed brackets pivoted to the frame at their forward ends and movable in horizontal relation to each other, said brackets having pivoted intermediate their ends traction supporting wheels, means whereby power from the engine may be utilized for driving the traction wheels, and means whereby the rear ends of the horizontally disposed brackets may be simultaneously moved during a steering operation.

7. The combination with a power cultivator comprising a frame having an engine thereon and driven traction wheels driven through gear connections with the engine at points forwardly of the centers of the wheels, of supporting means for said wheels, said supporting means comprising brackets pivoted to the frame at their forward ends, said traction wheels being pivoted to the brackets intermediate their ends, the rear ends of said brackets being connected together by a connecting bar, handle controlled steering means for moving said connecting bar transversely and means whereby power may be controlled from the engine to the traction wheels.

8. The combination with a cultivating machine comprising a frame, an engine, a clutch carried by said frame, gear connections between the engine and supporting wheels and controlled through the clutch, of means whereby the wheels may be simultaneously turned in parallel relation to each other, means whereby during the turning action of the wheels the frame will be moved transversely and means for controlling the clutch from adjacent the controlling means for the steering mechanism.

In testimony whereof I hereunto affix my signature.

EDWIN W. GETZ.